Figure 1:
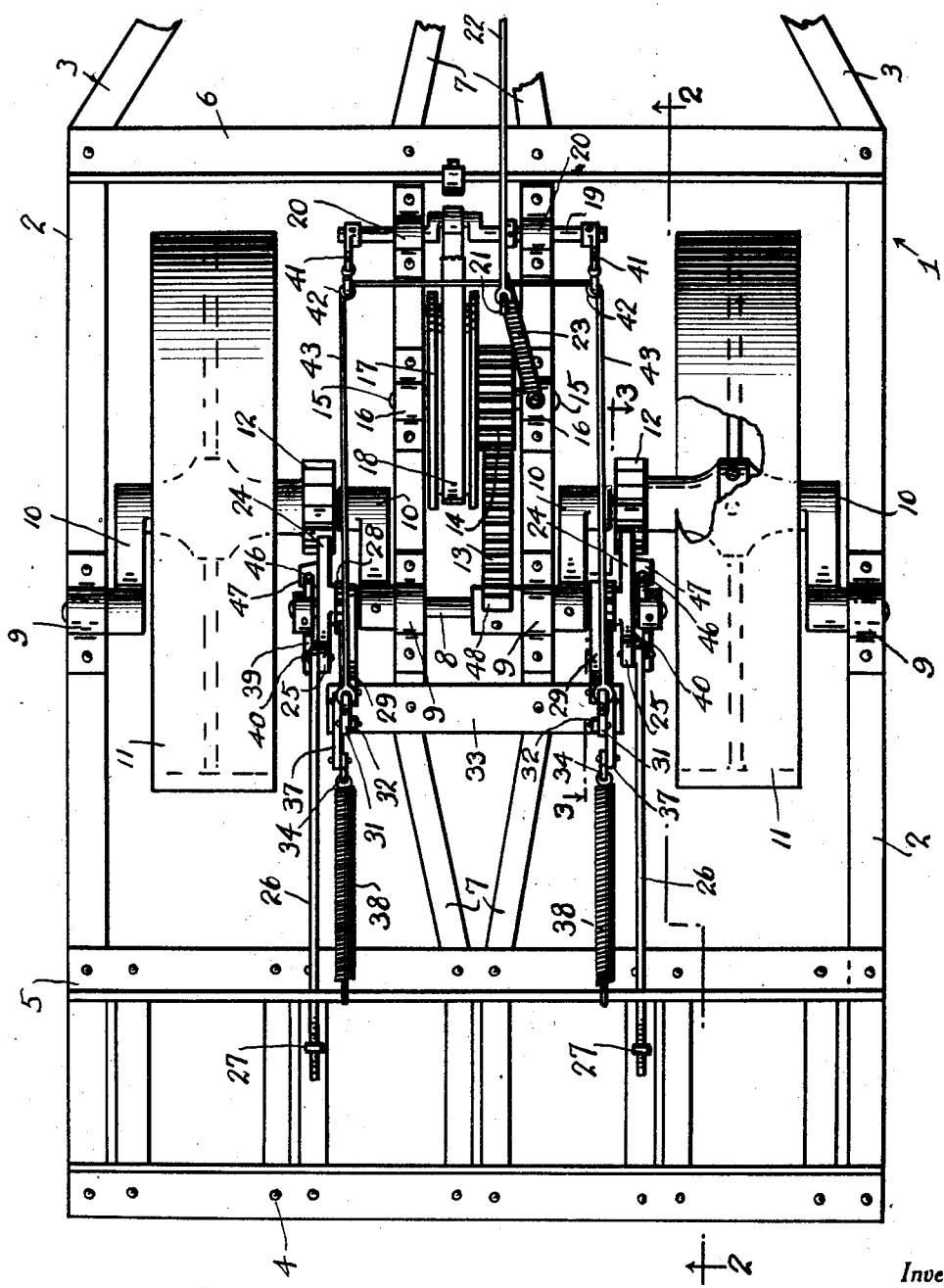

Nov. 17, 1931.  B. W. WILLIG  1,831,899
SCARIFIER
Filed Aug. 4, 1930  3 Sheets-Sheet 1

Inventor
Bruno W. Willig
By Clarence A. O'Brien
Attorney

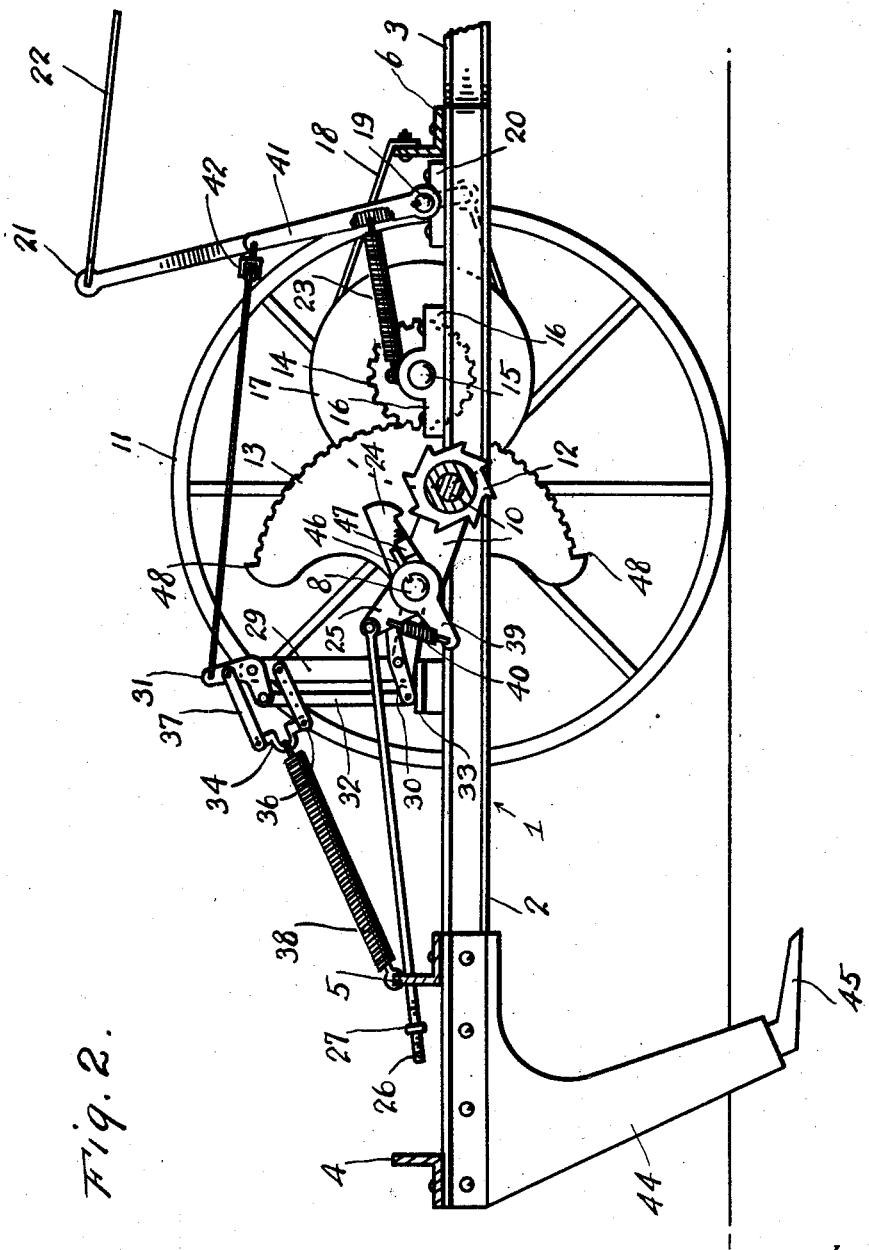

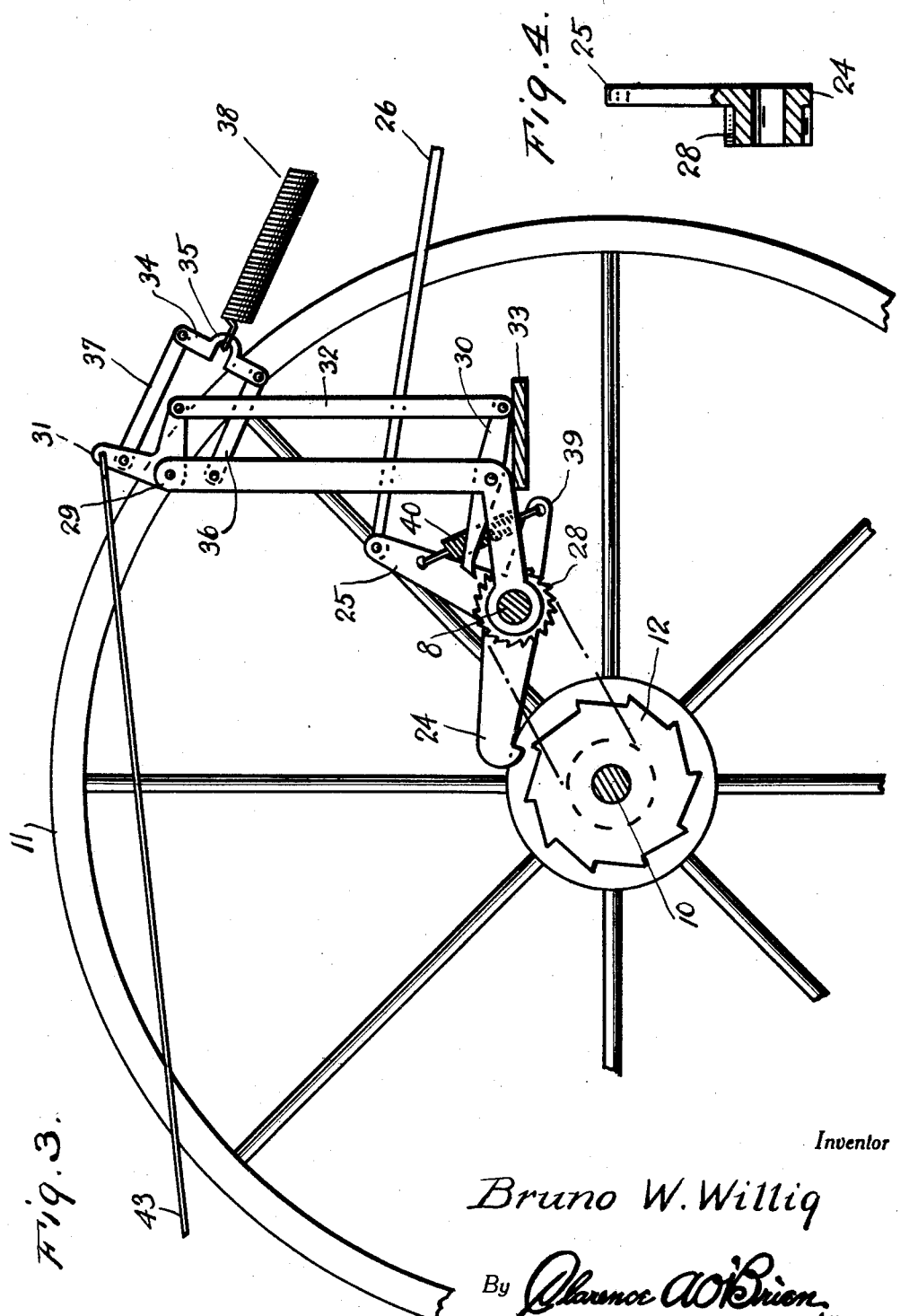

Patented Nov. 17, 1931

1,831,899

UNITED STATES PATENT OFFICE

BRUNO W. WILLIG, OF SAN ANGELO, TEXAS; MARY WILLIG EXECUTRIX OF SAID BRUNO W. WILLIG, DECEASED

SCARIFIER

Application filed August 4, 1930. Serial No. 472,908.

The present invention pertains to an earth scarifier of the type illustrated and described in my copending application which bears Serial No. 387,107 filed on August 20, 1929, and upon which this invention constitutes an improvement.

An important object of the invention is to provide, in a manner as hereinafter set forth, a scarifier of the aforementioned character which embodies means whereby the depth at which the tools operate may be expeditiously adjusted as desired and the invention further embodies novel means for securing the implement in adjusted position.

Another important object of the invention is to provide a scarifier of the character described which is adapted to be coupled to a tractor or other draft device to be drawn over the ground and which is adapted to be controlled for regulating the depth at which the tools operate and for securing the implement in adjusted position through the medium of a single cable which is operable by the operator of the tractor.

Other objects of the invention are to provide a scarifier of the character set forth which is comparatively simple in construction, which comprises few parts which is strong, durable, practical, reliable, which may be manufactured at low cost and which is otherwise well adapted for its purpose.

All of the foregoing and still further objects and advantages of the invention may become apparent from a study of the following specification taken in connection with the accompanying drawings, wherein like characters of reference designate corresponding parts throughout the several views, and wherein:

Figure 1 is a view in top plan of a scarifier constructed in accordance with the present invention with a portion of the wheel broken away and the forward portion of the frame removed, Figure 2 is a vertical longitudinal sectional view taken substantially on the line 2—2 of Figure 1 looking in the direction indicated by the arrows, Figure 3 is a vertical longitudinal sectional view taken substantially on the line 3—3 of Figure 1 looking in the direction indicated by the arrows, Figure 4 is a detail view partly in section of one of the ratchet engaging pawls.

Referring to the drawings in detail it will be seen that the reference numeral 1 designates generally a frame which comprises the longitudinally extending, parallel side bars 2 having the converging forward end portions 3 having means (not shown) at their converged ends for connection with the draw bar of a tractor or other draft implements (also not shown).

The rear ends of the side bars 2 have extending therebetween and secured thereon the transverse, spaced, parallel cross bars 4 and 5. A forward cross bar 6 extends between the side bars 2 and is secured thereon adjacent the converging portions of the side bars. The bars constituting the frame may be formed of any suitable material such as angle iron or channel iron.

Extending longitudinally of the frame 1 is a pair of centrally disposed bars 7 which extend from the converged forward ends of the portions 3 of the side bars 2 to the rearmost cross bar 4 of the frame, said bars 7 being rigidly secured to the cross bars 4, 5 and 6. The major portions of the bars 7 which are disposed between the cross bars 5 and 6 are spaced with respect to each other, as clearly seen in Figure 1 of the drawings. An axle 8 is journalled in the bearings 9 which are mounted in transverse alinement on the side bars 2 and the central bars 7 and said axle 8 is formed to provide the cranks 10 upon which the ground wheels 11 are journalled. The cranks 10 are disposed for rotary movement between the side bars 2 and the centrally disposed bars 7.

A ratchet 12 is fixed to the inner end of the hub of each of the ground wheels 11. Fixed on the axle 8 for vertical swinging movement therewith between the central bars 7 is a toothed segment 13 which is in mesh with a pinion gear 14 fixed on the shaft 15 which, in turn, is journalled in the bearings 16 on the centrally disposed bars 7. A brake drum 17 is also fixed on the shaft 15 and has trained therearound the brake band 18 having one end anchored to the cross bar 6 and its opposite end operatively connected to the crank shaft 19 which is journalled in the bearings 20 on the centrally disposed bars 7. As clearly seen in Figure 1, the opposite ends of the crank shaft 19 project outwardly from the bars 7. An upstanding lever 21 is fixed on the crank shaft 19 between the bars 7 and has connected to its upper end portion the operating cable 22 which extends to a point within convenient reach of the operator of the tractor or other implement to which the scarifier is attached. A coil spring 23 is operatively connected with the lever 21 and with a suitable portion of the implement frame for normally maintaining the band 18 in applied engagement with the drum 17. Pawls 24 are pivotally mounted on the axle 8 adjacent each of the ratchets 12 and adapted for operative engagement with said ratchets. The pawls 24 each include the upstanding angular arms 25 to the free ends of which the rods 26 are pivotally connected, said rods 26 extending slidably through the cross bar 5 and having threaded for adjustment thereon for engagement with the cross bar 5 the stop nuts 27. A ratchet 28 is also fixed on one side of each of the pawls 24 and said ratchets 28 encircle the shaft 8. Angular levers 29 are pivotally mounted on the axle 8 adjacent the free side of each of the ratchets 28, said levers 29 adapted for swinging movement in a vertical plane on the axle 8. A dog 30 has an intermediate portion pivotally connected to the angle of the lever 29 and one end of the dog 30 is adapted for operative engagement with the adjacent ratchet 28. A bell crank lever 31 is pivotally mounted on the upper end portion of each of the angular levers 29 and a link 32 operatively connects one end of the bell crank lever 31 with one end of the dog 30. A stop plate 33 is mounted transversely on the bars 7 for engagement by the levers 29 in the manner best illustrated in Figure 3 of the drawings for limiting the swinging movement of said levers 29 in one direction.

The lower end of the link 32 and one end of the dog 30 also engage with the stop plate 33 in a manner to limit the movement of these elements in one direction. A bar 34 having a yoke shaped intermediate portion 35 has one end pivotally connected to an upper portion of each of the levers 29 through the medium of the link 36 and its opposite end pivotally connected to each of the bell crank levers 31 through the medium of the link 37. A coil spring 38 is connected at one end to the bar 34, as clearly seen in Figure 3, and said coil spring has its opposite end connected to any desired point on the frame 1 such as the cross bar 5, (see Figure 1).

Rigid arms 39 are fixed on the axle 8 and coil springs 40 extend between said arms 39 and the portions 25 of the pawls 24 for normally maintaining said pawls 24 out of engagement with the ratchets 12. Upstanding arms 41 are fixed on the opposite end portions of the crank shaft 19 and have mounted on their upper ends the pulleys 42. An operating and equalizing cable 43 is trained around the pulleys 42 and has its opposite ends connected to the ends of the bell crank levers 31 which are free of the links 32.

Rooters 44 are rigidly mounted on the rear portion of the frame 1 and extend downwardly and forwardly in the manner clearly illustrated in Figure 2 of the drawings. Removable points 45 are secured in any approved manner in the free ends of the rooters 44.

In operation, the axle 8 is normally maintained against rotation in the frame 1 through the medium of the segment 13, the pinion gear 14 and the brake drum 17 and the brake band 18. As before explained, the band 18 is normally in operative engagement with the drum 17 through the medium of the coil spring 23 connected to the lever 21 in a manner to rock the crank shaft 19 in a direction to apply said brake band 18. The pawls 24 are normally maintained out of engagement with the ratchets 12 through the medium of the coil springs 40 thus permitting the ground wheels 11 to rotate freely on the cranks 10 of the axle 8.

When it is desired to elevate the frame 1 relative to the ground the operator pulls forwardly on the cable 22 in a manner to swing the lever 21 forwardly against the pull of the coil spring 23 and rock the crank shaft 19 to release the brake band 18 from the brake drum 17 and the axle 8 is then free to rotate in the frame 1. As the crank shaft 19 is rocked, the arms 41 are swung forwardly in a manner to pull the cable 43 forward. The initial movement of the cable 43 rocks the bell crank levers 31 in a manner to engage the dogs 30 with the ratchets 28 through the medium of the link 32, thus operatively coupling the angular levers 29 to the pawls 24. The continued forward movement of the cable 43 will now swing the levers 29 forwardly and cause the pawls 24 to be engaged with the ratchet 12 and thus lock the ground wheels 11 to the axle 8. As the ground wheels 11 continue to rotate in a forward direction, the cranks 10 of the axle 8 will be swung downwardly and the frame 1 of the implement will be elevated in an obvious manner.

The coil springs 38 yieldingly urge the angular lever 29 rearwardly toward their inoperative position and said coil springs 38 also yieldingly urge the bell crank levers 31 toward the inoperative position in which inoperative position, the dogs 30 are disengaged from the ratchets 28. As before explained, the stop plate 33 limits the movement of the levers 29 and the dogs 30 under the impulse of the coil springs 38.

When the cranks 10 of the axle 8 swing downwardly, as in elevating the frame 1, the pawls 24 which are engaged with the ratchets 12 and the arms 25 are swung forwardly. When the frame 1 has reached the limit of its upward adjustment or has reached the desired or predetermined adjustment, the stop nuts 27 will engage with the cross bar 5 and cause the pawls 24 to be disengaged from the ratchets 12 and the wheels 11 are again free to rotate on the cranks 10 of the axle 8. The stop nuts 27 may be adjusted on the rods 26 in a manner to cause the pawls 24 to be disengaged from the ratchets 12 when the frame 1 has reached the desired elevation. When the pawls 24 are disengaged from the ratchets 12, the cable 22 is released by the operator to permit the lever 21 to be swung rearwardly by the coil spring 23 for rocking the crank shaft 19 to apply the band 18 to the drum 17 and thus lock the axle 8 in adjusted position.

As best seen in Figure 2 of the drawings the arms 39 to which one end of the coil springs 40 are connected are mounted on the extending portions provided therefor on the axle 8 through the medium of eyes through which said axle 8 extends. Pins 46 extend from the eyes of the arms 39 for engagement by the lugs 47 on the pawls 24 for limiting the swinging movement of said pawls 24 in one direction independently of the axle 8 and under the impulse of the springs 40. In this manner the movement of the pawls 24 away from the ratchets 12 is limited.

Stop lugs 48 are formed on opposite ends of the segment 13 for engagement with the pinion gear 14 for preventing disengagement of the segment from said gear.

The herein illustrated and described embodiment of the invention is simply by way of exemplification and it is to be understood that changes in the details of construction may be had which will fall within the scope of the invention as claimed.

Having thus described my invention, what I claim as new is:

1. A scarifier of the character described comprising a frame, an axle journalled transversely on the frame, a pair of cranks formed on the axle, ground wheels journalled on the cranks, means for coupling the wheels and the cranks together for rotation in unison and in a manner to cause rotation of the axle, and frictional means supported on the frame for releasably retaining the axle against rotation.

2. A ground scarifier of the character described comprising a frame, an axle journalled transversely on the frame and including a pair of cranks, ground wheels journalled on the cranks, ratchets fixed to the wheels, pawls pivotally mounted on the axle for engagement with the ratchets for coupling the wheels, and the cranks together, and manually controlled frictional means for retaining the axle against rotation.

3. A scarifier of the character described comprising a frame, an axle journalled transversely for rotation on the frame and including a pair of cranks, ground wheels journalled on the cranks, means for connecting the cranks to the ground wheels for actuation by said ground wheels, a toothed segment fixed on the axle for rotation therewith, a shaft supported for rotation on the frame, a pinion gear fixed on the shaft and in mesh with the segment for actuation by said segment, a brake drum fixed on the shaft, a brake band engageable with the drum, and manually operable means for disengaging the band from the drum.

4. A scarifier of the character described comprising a frame, an axle journalled transversely for rotation on the frame and including a pair of cranks, ground wheels journalled on the cranks, means for connecting the cranks to the ground wheels for actuation by said ground wheels, a toothed segment fixed on the axle for rotation therewith, a shaft supported for rotation on the frame, a pinion gear fixed on the shaft and in mesh with the segment for actuation by said segment, a brake drum fixed on the shaft, a brake band engageable with the drum, and manually operable means for disengaging the band from the drum, said means comprising a crank shaft mounted for rotation on the frame, a lever fixed to the crank shaft, an actuating cable for shifting the lever in one direction, and a coil spring connected with the lever for shifting said lever in another direction for normally maintaining the band in operative engagement with the drum.

5. A scarifier of the character described comprising a frame, an axle journalled transversely for rotation on the frame and including a pair of cranks, ground wheels journalled on the cranks, means for releasably securing the axle against rotation on the frame, and means for releasably coupling the cranks to the wheels for actuation by said wheels, said means comprising ratchets fixed to the wheels, pawls mounted for swinging movement on the axle and engageable with the ratchets, angularly disposed arms extending from the pawls, ratchets fixed on the pawls and encircling the axle, an angular lever mounted for swinging movement on the axle, one of said angular levers being disposed adjacent each of the pawls, a dog pivotally mounted for swinging movement on each of the angular levers, said dog engageable with the second named ratchets for operatively coupling the angular levers to the pawls, a bell crank lever pivotally mounted on each of the angular levers, links operatively connecting the bell crank lever to the dogs, operating means connected to each of the bell crank levers for swinging same on the angular levers, and for imparting swinging movement to said angular levers.

6. A scarifier of the character described comprising a frame, an axle journalled transversely for rotation on the frame and including a pair of cranks, ground wheels journalled on the cranks, means for releasably securing the axle against rotation on the frame, and means for releasably coupling the cranks to the wheels for actuation by said wheels, said means comprising ratchets fixed to the wheels, pawls mounted for swinging movement on the axle and engageable with the ratchets, angularly disposed arms extending from the pawls, ratchets fixed on the pawls and encircling the axle, an angular lever mounted for swinging movement on the axle, one of said angular levers being disposed adjacent each of the pawls, a dog pivotally mounted for swinging movement on each of the angular levers, said dog engageable with the second named ratchets for operatively coupling the angular levers to the pawls, a bell crank lever pivotally mounted on each of the angular levers, links operatively connecting the bell crank lever to the dogs, operating means connected to each of the bell crank levers for swinging same on the angular levers, and for imparting swinging movement to said angular levers, resilient means common to each of the angular levers and the bell crank levers for yieldingly retaining same in inoperative position, stop means supported on the frame for engagement with the angular levers and the links for limiting the swinging movement of the said angular levers and the bell crank levers under the impulse of the resilient means.

7. A scarifier of the character described comprising a frame, an axle journalled transversely for rotation on the frame and including a pair of cranks, ground wheels journalled on the cranks, means for releasably securing the axle against rotation on the frame, and means for releasably coupling the cranks to the wheels for actuation by said wheels, said means comprising ratchets fixed to the wheels, pawls mounted for swinging movement on the axle and engageable with the ratchets, angularly disposed arms extending from the pawls, ratchets fixed on the pawls and encircling the axle, an angular lever mounted for swinging movement on the axle, one of said angular levers being disposed adjacent each of the pawls, a dog pivotally mounted for swinging movement on each of the angular levers, said dog engageable with the second named ratchets for operatively coupling the angular levers to the pawls, a bell crank lever pivotally mounted on each of the angular levers, links operatively connecting the bell crank lever to the dogs, operating means connected to each of the bell crank levers for swinging same on the angular levers, and for imparting swinging movement to said angular levers, resilient means common to each of the angular levers and the bell crank levers for yieldingly retaining same in inoperative position, stop means supported on the frame for engagement with the angular levers and the links for limiting the swinging movement of the said angular levers and the bell crank levers under the impulse of the resilient means, and rods pivotally connected, at one end, to the free end portions of the angular arms of the pawls, said rods extending slidably through portions of the frame and stop nuts threaded for adjustment on each of the rods and engageable with the frame for disengaging the pawls from the first named ratchets after a predetermined movement of the cranks in unison with the ground wheels.

In testimony whereof I affix my signature.

BRUNO W. WILLIG.